United States Patent
Taubman

(10) Patent No.: US 12,452,426 B2
(45) Date of Patent: Oct. 21, 2025

(54) ENHANCED METHOD AND APPARATUS FOR IMAGE COMPRESSION

(71) Applicant: KAKADU R & D PTY LTD, Glebe (AU)

(72) Inventor: David Scott Taubman, Glebe (AU)

(73) Assignee: KAKADU R & D PTY LTD, Glebe (AU)

( * ) Notice: Subject to any disclaimer, the term of this patent is extended or adjusted under 35 U.S.C. 154(b) by 146 days.

(21) Appl. No.: 18/248,063

(22) PCT Filed: Oct. 14, 2021

(86) PCT No.: PCT/AU2021/051206
§ 371 (c)(1),
(2) Date: Apr. 6, 2023

(87) PCT Pub. No.: WO2022/077071
PCT Pub. Date: Apr. 21, 2022

(65) Prior Publication Data
US 2023/0388507 A1    Nov. 30, 2023

(30) Foreign Application Priority Data
Oct. 14, 2020 (AU) ............... 2020903733

(51) Int. Cl.
*H04N 19/13* (2014.01)

(52) U.S. Cl.
CPC .................. *H04N 19/13* (2014.11)

(58) Field of Classification Search
CPC ........ H04N 19/13; H04N 19/70; H04N 19/91; H04N 19/63; H03M 7/42; H03M 7/4093; H03M 7/4018
See application file for complete search history.

(56) References Cited

U.S. PATENT DOCUMENTS

| | | | | |
|---|---|---|---|---|
| 2007/0053425 A1* | 3/2007 | Ridge | .................. | H04N 19/136 375/240 |
| 2008/0094259 A1* | 4/2008 | Yu | .......................... | H04N 19/34 375/E7.184 |
| 2014/0086307 A1* | 3/2014 | Karczewicz | ........... | H04N 19/18 375/240.02 |
| 2019/0222845 A1* | 7/2019 | Taubman | ............. | H04N 19/647 |

FOREIGN PATENT DOCUMENTS

| | | |
|---|---|---|
| WO | WO 2017/201574 | 11/2017 |
| WO | WO 2019/191811 | 10/2019 |
| WO | WO 2020/073098 | 4/2020 |

OTHER PUBLICATIONS

Extended European Search Report issued in related application No. EP21878796.8 dated Oct. 18, 2024.
Taubman, D. et al., "High Throughput Block Coding in the HTJ2K Compression Standard," IEEE, 2019, pp. 1079-1083.
Taubman et al, High Throughput JPEG 2000 (HTJ2K): Algorithm, Performance, and Potential; 2020, 23-24.
Watanabe et al, A Matlab Implementation of the Emerging HTJ2K Standard, 2019, 2019 IEEE $8^{th}$ Global Conference on Consumer Electronics, 491-495.
International Search Report and Written Opinion were mailed on Nov. 30, 2021 by the International Searching Authority for International Application No. PCT/AU2021/051206 filed on Oct. 14, 2021 and published as WO 2022/077071A1 (Applicant—Kakadur & D Pty Ltd) (12 pages).

* cited by examiner

*Primary Examiner* — Fabio S Lima
(74) *Attorney, Agent, or Firm* — Ballard Spahr LLP

(57) ABSTRACT

Described is a method of image compression and decompression involving a variable-to-variable coding scheme, for example as used or of similar nature to a HT Cleanup encoding algorithm, as described in ISO/IEC 15444-15: 2019. The method involves a lookup table that the encoder addresses using a potentially modified version of the EMB pattern, a potentially modified version of the significance pattern, and any additional context information, in order to find the associated variable length codeword. The modified significance pattern and modified EMB pattern, each consisting of 1 bit per sample in a quad, implicitly identify the quad's original significance pattern and the quad's 1-bit unsigned residual offset value, together with some or all of the quad's original EMB pattern, both when the unsigned residual offset value is 1 and, for specific values of the significance pattern, when the unsigned residual offset value is 0.

9 Claims, No Drawings

ENHANCED METHOD AND APPARATUS FOR IMAGE COMPRESSION

CROSS-REFERENCE TO RELATED APPLICATIONS

This application is a U.S. National Phase Application of International Application No. PCT/AU2021/051206 filed Oct. 14, 2021, which claims priority to Australian Application No. 2020903733, filed Oct. 14, 2020, each of which are hereby incorporated by reference in their entirety.

FIELD OF THE INVENTION

The present invention relates to a method and apparatus for image compression, and particularly, but not exclusively, to an enhancement to the HT block coding method described in ISO/IEC 15444-15:2019, known as High Throughput JPEG 2000.

BACKGROUND OF THE INVENTION

The High Throughput JPEG 2000 standard documented in ISO/IEC 15444-15:2016 describes a block coding algorithm consisting of Cleanup, SigProp and MagRef coding passes, of which the most distinctive feature is the HT Cleanup pass. The applicant's earlier patent applications, published as WO2017/201574, WO2019/191811 and WO2020/073098 also provide explanation of the high throughput block encoding technology. These documents provide explanation of the applicant's earlier technology for which the present document discloses enhancements.

The HT Cleanup pass involves three bit-streams, known as the MagSgn, VLC and MEL bit-streams, that collectively encode a rectangular block of sample values of width Wblk and height Hblk, where samples indexed by n have sign $s_n$ and magnitude $\mu_n$. Samples are encoded or decoded in 2×2 blocks, and samples are traversed in a quad-based scanning pattern, such that consecutive indices n address the top-left, bottom-left, top-right and bottom-right samples of each 2×2 quad before advancing to the next quad within a pair of lines, and then on to subsequent line-pairs.

Each quad q is assigned a 4-bit significance pattern $\rho_q$ that indicates the significance a $\sigma_n$ of each sample n in the quad, where a $\sigma_n=1$ means that the sample is significant, which is true if and only if $\mu_n \neq 0$, while $\sigma_n=0$ means that the sample is insignificant. Each sample is represented indirectly via its MagSgn value $v_n$, together with its significance $\sigma_n$, where $$v_n = \begin{cases} 2(\mu_n - 1) + s_n & \text{if } \sigma_n = 1 \\ 0 & \text{if } \sigma_n = 0 \end{cases}$$

Significance patterns are coded using a combination of two different techniques: an adaptive run-length code (MEL code) and a set of non-adaptive variable length coding (VLC) codes (CxtVLC codes).

Each sample has an exponent $E_n$ which corresponds to the smallest number of least significant bits from $v_n$ that are required to capture all of its non-zero bits. That is, $E_n$ is the smallest non-negative integer E such that $v_n < 2^E$.

An exponent upper bound $U_q$ is coded for each quad q, via a predictor $\kappa_q$ and an "unsigned prediction residual" $u_q \geq 0$, where the predictor $\kappa_q$ for quad q is derived from previous coded sample magnitudes. Specifically, $U_q \geq E_q^{max}$, where is the largest exponent $E_n$ amongst all samples in the quad. We note that the value of $E_q^{mx}$ need not be explicitly computed by an encoder or decoded by a decoder, but it provides a convenient means to explain the present invention.

The significance pattern $\rho_q$ and unsigned prediction residuals $u_q$ for a quad are coded jointly, using a VLC coding scheme that involves two sub-codes, one of which (CxtVLC code) is dependent on a neighbourhood significance context $c_q$ and best suited to table-lookup approaches, while the other (U-VLC code) is amenable to direct computation if required.

The CxtVLC also encodes a variable amount of additional information about the magnitude exponents of each sample in the quad. This information, known as EMB pattern information, is combined with the exponent bound $U_q$ and significance pattern $\rho_q$ to determine the number of sign and least significant magnitude bits from each sample of each quad that are packed into a MagSgn bit stream.

Specifically, the CxtVLC encodes the 4-bit quantity $\rho_q$, a 1-bit quantity $u_q^{off}$ that is 1 if and only if $u_q \neq 0$, and 0 to 4 bits of the EMB pattern $\epsilon_q$, whose 4 bits correspond to the quantities $e_n$ for each sample in the quad, where $$e_n = \left\lfloor \frac{v_n}{2^{U_q-1}} \right\rfloor$$

The exponent bound $U_q$ is an upper bound for the exponent $E_n$ associated with each sample in quad q, so the $e_n$ values produced by the above equation are certain to be binary valued—i.e., $e_n \in \{1,1\}$.

The set of bits from the EMB pattern $\epsilon_q$ that are actually coded with the CxtVLC codeword for quad q is data dependent, being constrained in part by the maximum length of CxtVLC codewords, which is 7 in the HT Cleanup algorithm of ISO/IEC 15444-15:2019. Binary value $k_n$ identify whether or not $e_n$ is coded in the CxtVLC codeword. Decoders can deduce the $k_n$ values, along with quantities $i_n = k_n \cdot e_n$, from the CxtVLC codewords.

The CxtVLC mechanism can thus be understood as a variable-to-variable coding scheme, whereby a variable number of bits (e.g. 0 to 7 bits) are used to encode a variable amount of information about each quad (0 to 4 EMB bits, in addition to $\rho_q$ and $u_q^{off}$). A separate set of codewords is used for each context $c_q$, which depends upon the significance of samples neighbouring the quad that have already been coded.

The least significant $m_n = \sigma_n \cdot (U_q k_n)$ bits of $v_n$ are packed into the MagSgn bit-stream. Decoders can readily combine these bits with the values $\sigma_n$, $k_n$ and $i_n$ to recover $v_n$ and hence the magnitude $\mu_n$ and sign $s_n$ of each sample.

The HT Cleanup algorithm described in ISO/IEC 15444-15:2019 allows EMB pattern information to be coded via CxtVLC codewords only when $u_q^{off}=1$. This restriction was because it simplifies the encoding procedure, since when $u_q^{off}=1$, the encoder can always arrange for $U_q$ to be equal to $E_q^{max}$, so that at least one of the $e_n$ values is non-zero. This allows the encoder to avoid passing $u_q^{off}$ explicitly to the lookup table used to implement CxtVLC encoding. Instead, it can look up CxtVLC codewords using only $c_q$, $\rho_q$ and the 4-bit modified EMB pattern $\bar{\epsilon}_q = u_q^{off} \cdot \epsilon_q$—note that $u_q^{off}$ is equal to 1 if and only if $\bar{\epsilon}_q$ a is non-zero.

There is an ongoing need to provide methods which can improve coding efficiency in a manner compatible with standards compliant decoders. In particular, it is desirable to increase the amount of information that is jointly coded using redundancy-exploiting techniques such as variable length coding and it is desirable to do this without significantly altering the standardised decoding procedures themselves.

SUMMARY OF INVENTION

There can be benefits to allowing at least some EMB pattern information to be communicated via CxtVLC codes even when $u_q^{\mathit{off}}=0$. One important example where this can improve coding efficiency is when $\rho_q=15$ and $U_q=E_q^{max}$. In this case, all samples in a quad are significant and the EMB pattern $\epsilon_q$ can be interpreted as the most significant magnitude bit-plane associated with the quantities $\max\{0, \mu_n-1\}$ for the quad's 4 samples. The predictor $\kappa_q$ is designed to be one less than the number of bits we would expect to require to represent $v_n$, so it is quite likely that all four samples in the quad have $e_n=1$ when $\rho_q=15$ and $U_q=\kappa_q$; this can be efficiently captured via suitable CxtVLC codes.

This invention describes a mechanism to overcome the encoder complexity related limitations to coding EMB pattern information when $u_q^{\mathit{off}}=0$, allowing the development of CxtVLC codebooks with potentially higher coding efficiency.

An aspect provides method of image compression involving a variable-to-variable coding scheme, whereby a variable number of bits are used to encode a variable amount of information from a bounding magnitude bit-plane (EMB pattern) within a group of samples (hereinafter identified as a quad), in addition to encoding the significance of each sample in the quad (significance pattern) and a 1-bit unsigned residual offset value that indicates whether said bounding bit-plane is greater than a reference value (offset=1) or equal to the reference value (offset=0), the method involving a lookup table that the encoder addresses using a potentially modified version of the EMB pattern, a potentially modified version of the significance pattern, and any additional context information, in order to find the associated variable length codeword, wherein the modified significance pattern and modified EMB pattern, each consisting of 1 bit per sample in the quad, implicitly identify the quad's original significance pattern and the quad's 1-bit unsigned residual offset value, together with some or all of the quad's original EMB pattern, both when the unsigned residual offset value is 1 and, for specific values of the significance pattern, when the unsigned residual offset value is 0.

Another aspect provides a method of image compression providing an extension of a HT Cleanup encoding algorithm, as described in ISO/IEC 15444-15:2019, wherein context dependent variable length code (CxtVLC) lookup tables are indexed using a modified significance pattern, a modified EMB pattern and a context value, where the modified significance pattern and modified EMB pattern, each consisting of 4 bits, implicitly identify a quad's original 4-bit significance pattern and the quad's 1-bit unsigned residual offset value, together with some or all of the quad's original 4-bit EMB pattern, both when the unsigned residual offset value is 1 and, for specific values of the significance pattern, when the unsigned residual offset value is 0.

Another aspect provides a method of image wherein the context dependent variable length (CxtVLC) code includes codewords that communicate EMB pattern information for specific values of a quad's significance pattern when an unsigned residual offset value is 0.

In some embodiments the modified significance and modified EMB pattern values identify the original EMB pattern when the unsigned residual offset value is 0 and all samples in the quad are significant.

In some embodiments a quad's modified EMB pattern and modified significance pattern depend on whether or not the following three conditions hold:
  a) all samples in the quad are significant;
  b) the quad's unsigned residual offset value is 0; and
  c) the quad's original EMB pattern is non-zero;

such that the modified EMB pattern is set to 0 or its original EMB pattern, the latter being the case if the quad's unsigned residual offset value is 1 or else all three conditions hold, while the quad's modified significance pattern is set to its original significance pattern or 0, the latter being the case if all three conditions hold.

In some embodiments, the CxtVLC code includes multiple codewords for which the unsigned residual offset value is 0 and the significance pattern has all bits equal to 1, indicating that all samples in the quad are significant, at least one such codeword serving to communicate EMB pattern information for the quad.

In some embodiments a quad's modified EMB pattern is the same as its original EMB pattern, while the quad's modified significance pattern is set to either its original significance pattern or the bit-wise exclusive OR of its original significance and EMB patterns, the latter being the case if the quad's unsigned residual offset value is 0.

Embodiments also provide a method for decompression of images compressed in accordance with the embodiments above.

An aspect provides method of image decompression involving a variable-to-variable coding scheme, whereby a variable number of bits are used to encode a variable amount of information from a bounding magnitude bit-plane (EMB pattern) within a group of samples (hereinafter identified as a quad), in addition to encoding the significance of each sample in the quad (significance pattern) and a 1-bit unsigned residual offset value that indicates whether said bounding bit-plane is greater than a reference value (offset=1) or equal to the reference value (offset=0), the method involving a lookup table that the encoder addresses using a potentially modified version of the EMB pattern, a potentially modified version of the significance pattern, and any additional context information, in order to find the associated variable length codeword, wherein the context dependent variable length (CxtVLC) code includes codewords that communicate EMB pattern information for specific values of a quad's significance pattern when an unsigned residual offset value is 0, wherein at least one such codeword serves to communicate magnitude exponent (EMB) pattern information for the quad.

Embodiments can provide an extension of the HT Cleanup encoding and decoding algorithm, as described in ISO/IEC 15444-15:2019.

DETAILS OF THE PREFERRED EMBODIMENT

Embodiments of the present invention relate to a modified coder implementation providing an extension for the High Throughput JPEG 2000 standard block coding algorithm described in the background section (the HTJ2K standard). Embodiments also provide an enhanced decoding method by virtue of the enhanced encoding.

In the method of embodiments of this invention, an enhanced block encoder addresses the CxtVLC table using context $c_q$, a modified significance pattern $\bar{\rho}_q$, and a modified 4-bit pattern $\bar{\epsilon}_q$, which are determined in such a way that the value of $u_q^{\mathit{off}}$ is implied by $\bar{\rho}_q$ and $\bar{\epsilon}_q$, while preserving all information in $\rho_q$ and some or all of the information in $\epsilon_q$, both when $u_q^{off}=1$ and also when $u_q^{off}=0$ and $\rho_q=15$.

Importantly, in this invention the encoder uses the same number of index bits to address the CxtVLC table as it did in the original HT block coding algorithm—4 bits from $\overline{\rho}_q$, 4 bits from $\overline{\epsilon}_q$, plus the bits associated with the context $c_q$. In this way, the enhancement of this invention can be obtained with almost no increase in implementation complexity.

The decoding procedure is not actually changed at all by the method of this invention. CxtVLC decoding still produces values for $\rho_q$, $u_q^{off}$ and the $k_n$ and $i_n$ values, from which the decoder knows the number of bits $m_n=\sigma_n \cdot (U_q-k_n)$ to unpack from the MagSgn bit-stream, combining them with $\sigma_n$ and $i_n$ to recover $v_n$ and thence $\mu_n$ and $s_n$. However, the CxtVLC table itself will be different, since it can now include codewords corresponding to $u_q^{off}=0$, in which one or more of the $k_n$ are non-zero.

In a preferred embodiment, the encoder constructs $\overline{\rho}_q$ and $\overline{\epsilon}_q$ as follows:

$$\overline{\epsilon}_q = \begin{cases} \epsilon_q & \text{if } \rho_q = 15 \text{ and } u_q^{off} = 0 \text{ and } \epsilon_q \neq 0 \\ u_q^{off} \cdot \epsilon_q & \text{otherwise} \end{cases}$$

$$\overline{\rho}_q = \begin{cases} 0 & \text{if } \rho_q = 15 \text{ and } u_q^{off} = 0 \text{ and } \epsilon_q \neq 0 \\ \rho_q & \text{otherwise} \end{cases}$$

This works because in the case where $\epsilon_q \neq 0$, the significance pattern $\rho_q$ cannot possibly be 0. It can be deduced, therefore, that when $\overline{\epsilon}_q \neq 0$ and $\overline{\rho}_q = 0$ the value of $\rho_q$ must be 15. Moreover, $u_q^{off}=1$ if and only if $\overline{\epsilon}_q \neq 0$ and $\overline{\rho}_q \neq 0$, so long as the encoder makes the sensible choice $U_q=E_q^{max}$ whenever $\kappa_q \leq E_q^{max}$ so that $\epsilon_q \neq 0$ whenever $u_q^{off}=1$. In this way, non-zero EMB patterns $\epsilon_q$ can be made available for CxtVLC coding even when $u_q^{off}=0$, at least in the important case where $\rho_q=15$.

More generally, embodiments of the invention can exploit the fact that whenever any EMB bit $e_n=1$, the corresponding significance bit must be a $\sigma_n=1$, so that the corresponding bit within $\overline{\rho}_q$ a can be used to implicitly communicate $u_q^{off}$.

In one general embodiment of the invention, that exploits this principle, the encoder constructs $\overline{\rho}_q$ and $\overline{\epsilon}_q$ as follows:

$$\overline{\epsilon} = \epsilon_q$$

$$\overline{\rho}_q = \begin{cases} \rho_q \oplus \epsilon_q & \text{if } u_q^{off} = 0 \\ \rho_q & \text{otherwise} \end{cases}$$

Here $\oplus$ denotes bit-wise "exclusive OR." In this embodiment, $u_q^{off}$ is implicitly identified as 0 if $\overline{\epsilon}_q=0$ or if any bit position within $\overline{\epsilon}_q$ is 1, while the corresponding bit position within $\overline{\rho}_q$ is 0; otherwise $u_q^{off}$ must be 1. As before, this relies on the assumption that the encoder makes the sensible choice $U_q=E_q^{max}$ whenever $\kappa_q \leq_q^{max}$ so that $\epsilon_q \neq 0$ whenever $u_q^{off}=1$. Also, $\rho_q$ is easily recovered from the modified EMB and significance bit patterns by taking their bit-wise "inclusive OR"—i.e., $\rho_q=\overline{\rho}_q \vee \overline{\epsilon}_q$.

To summarise key points described above:

The CxtVLC coding procedure in the HTJ2K standard allows a decoder to decode 3 quantities (significance pattern $\rho_q$, partial EMB pattern information, and unsigned residual offset $u_q^{off}$), all from a variable length codeword with 0-7 bits.

Importantly, the amount of EMB pattern information contained in a CxtVLC codeword is variable—anywhere from no EMB information to all 4 bits of EMB pattern information are communicated, depending on the codeword—it is a variable-to-variable coding scheme, coding a variable amount of information, using a variable number of bits.

The HTJ2K encoding procedure only uses a 3-bit context value, a 4-bit significance pattern $\rho_q$ and a 4-bit EMB pattern $\epsilon_q$, multiplied by the binary $u_q^{off}$ value. These 11 bits address a lookup table that generates the CxtVLC codewords, relying upon the fact that these implicitly identify $u_q^{off}=0$, but at the expense of discarding all EMB pattern information $\epsilon_q$ when $u_q^{off}=0$.

The present invention is based on the insight that there are ways to communicate some EMB pattern information even when $u_q^{off}=0$ without using additional bits to address the CxtVLC table in the encoder.

The key to this is to address the lookup table using a modified EMB pattern and a modified significance pattern, having the same number of bits as the original EMB and significance patterns.

The terminology of relevance to the description above is summarised as follows:

1. EMB pattern—the bit pattern $\epsilon_q$ consisting of all $e_n$ bits for a given quad q.

"EMB pattern" is a term in the HTJ2K standard, where it is a 4-bit word for each 22 quad being coded, that consists of the bits $e_n$. This is the most significant bit-position that can contain non-zero bits. The EMB pattern is statistically skewed and in the context of the present invention presents an opportunity for coding efficiency gains through variable length coding methods, which is why it is desirable to include EMB pattern information in the variable length CxtVLC codewords whenever possible, subject to the constraint that CxtVLC codewords should exceed a given maximum length.

2. Modified EMB pattern—a bit pattern $\overline{\epsilon}_q$, derived from and having the same number of bits as the original EMB pattern $\epsilon_q$, that is used to address the encoder's CxtVLC lookup table.

3. Partial EMB pattern information—partial information about the original EMB pattern (0 or more of the original EMB bits) that the decoder discovers when it encounters a particular CxtVLC codeword.

4. Significance pattern—the bit pattern $\rho_q$ consisting of all $\sigma_n$ bits for a given quad q, identifying whether or not each sample in the quad is non-zero.

5. Modified significance pattern—a bit pattern $\overline{\rho}_q$, derived from and having the same number of bits as the original significance pattern, that is used to address the encoder's CxtVLC lookup table.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method of image compression involving a variable-to-variable coding scheme, whereby a variable number of bits are used to encode for each rectangular block of 4 samples, herein identified as a quad:
   i) a significance of each sample in the quad, herein identified as a significance pattern, comprising 4 bits with one bit for each sample in the quad indicating whether the sample in the quad is zero or non-zero;
   ii) a variable amount of information from a 4 bit EMB pattern for the quad, said EMB pattern consisting of the magnitude bits from each of the quad's samples that are found within a bounding magnitude bit-plane for the quad, said bounding magnitude bit-plane having the property that no samples of the quad have non-zero magnitude bits in any higher bit-plane;
   iii) a 1-bit unsigned residual offset value that indicates whether said bounding magnitude bit-plane is greater than a reference value or equal to the reference value, wherein the 1-bit unsigned residual value for the quad being 0 indicates the said bounding magnitude bit plane is equal to the reference value and the 1-bit unsigned residual value for the quad being 1 indicates the said bounding magnitude bit plane is greater than the reference value, said reference value depending on the sample values associated with previously encoded quads,
   the method involving a lookup table that an encoder addresses in order to find a suitable codeword from a context dependent variable length (CxVLC) code, wherein the CxtVLC code includes codewords that communicate EMB pattern information for specific values of a significance pattern for the quad when an unsigned residual offset value for the quad is 0,
   the method comprising the steps of:
      determining for the quad a modified significance pattern and a modified EMB pattern, each consisting of 1 bit per sample in the quad, based on the original significance pattern for the quad, the original EMB pattern for the quad, and the 1-bit unsigned residual offset value for the quad,
      the modified EMB pattern including some or all of the original EMB pattern for the quad both when the unsigned residual offset value is 1 and, for specific values of the significance pattern for the quad, when the unsigned residual offset value for the quad is 0,
      whereby the 8 bits of the modified significance and the modified EMB pattern infer the residual offset value for the quad, in addition to the original significance pattern for the quad, through transformations that exploit the property that whenever any EMB bit is 1, the corresponding significance bit must be 1.

2. The method of image compression of claim 1, wherein the CxtVLC code includes codewords that communicate EMB pattern information for specific values of a significance pattern for a quad when an unsigned residual offset value is 0.

3. The method of image compression of claim 1 wherein the modified significance and modified EMB pattern values identify the original EMB pattern when the unsigned residual offset value is 0 and all samples in the quad are significant.

4. The method of image compression of claim 2, where, for a quad, a modified EMB pattern and a modified significance pattern depend on whether or not the following three conditions hold:
   a) all samples in the quad are significant;
   b) the unsigned residual offset value for the quad is 0; and
   c) the original EMB pattern for the quad is non-zero;
   wherein
   (i) the modified EMB pattern is set to its original EMB pattern for the quad if the unsigned residual offset value for the quad is 1 or when all three conditions a), b), and c), hold, otherwise the modified EMB pattern is set to 0; and
   (ii) the modified significance pattern is set to 0 if all three conditions a), b), and c), hold, otherwise the modified significance pattern is the original significance pattern for the quad.

5. The method of image compression of claim 1, where the CxtVLC code includes multiple codewords for which the unsigned residual offset value is 0 and the bits of the significance pattern are all 1, indicating that all samples in the quad are significant, at least one such codeword serving to communicate EMB pattern information for the quad.

6. The method of image compression of claim 1 wherein,
   a modified EMB pattern for a quad is the same as an original EMB pattern for the quad, and
   a modified significance pattern for the quad is set to:
      a bit-wise exclusive OR of an original significance pattern for the quad and the original EMB pattern for the quad if the unsigned residual offset value for the quad is 0, or
      the original significance pattern for the quad otherwise.

7. The method of image compression as claimed in claim 1, wherein the method provides an extension of a HT Cleanup encoding algorithm in accordance with ISO/IEC 15444-15:2019.

8. A method of image decompression involving decoding compressed image data encoded using a variable-to-variable coding scheme, wherein a variable number of bits encode for each rectangular block of 4 samples herein identified as a quad:
   i) a significance of each sample in the quad, herein identified as a significance pattern;
   ii) a variable amount of information from a 4-bit EMB pattern for the quad, said EMB pattern consisting of the magnitude bits from each of the quad's samples that are found within a bounding magnitude bit-plane for the quad, said bounding magnitude bit-plane having the property that no samples of the quad have non-zero magnitude bits in any higher bit-plane;
   iii) a 1-bit unsigned residual offset value that indicates whether said bounding magnitude bit-plane is greater than a reference value or equal to the reference value, wherein the 1-bit unsigned residual value being 0 indicates the said bounding magnitude bit plane is equal to the reference value and the 1-bit unsigned residual value being 1 indicates the said bounding magnitude bit plane is greater than the reference value, said reference value depending on the sample values associated with previously encoded quads,
   the method involving a decoder addressing a lookup table that identifies the encoded codeword from a context-adaptive variable length code, herein known as the CxtVLC code, along with the significance pattern, unsigned residual offset value, and partial any EMB pattern information associated with that codeword, wherein at least one codeword in the CxVLC code serves to communicate magnitude exponent (EMB) pattern information for the quad, when the unsigned residual offset value is 0.

9. The method of image decompression as claimed in claim 8, wherein the method provides an extension of a HT Cleanup encoding and decoding algorithm in accordance with ISO/IEC 15444-15:2019.

* * * * *